United States Patent [19]

Lee, II et al.

[11] Patent Number: 4,492,360

[45] Date of Patent: Jan. 8, 1985

[54] PIEZOELECTRIC VALVE

[75] Inventors: Leighton Lee, II, Guilford; Gerald W. O'Dell, Old Lyme; Ludwig K. Holtermann, Old Saybrook, all of Conn.

[73] Assignee: The Lee Company, Westbrook, Conn.

[21] Appl. No.: 385,885

[22] Filed: Jun. 7, 1982

[51] Int. Cl.³ .............................................. F16K 31/04
[52] U.S. Cl. .................................. 251/129; 310/330; 251/285
[58] Field of Search .................. 251/129, 11, 285; 310/332, 330, 350

[56] References Cited

U.S. PATENT DOCUMENTS

| | | | |
|---|---|---|---|
| 2,171,243 | 8/1939 | McKesson | 310/350 X |
| 2,478,223 | 8/1949 | Argabrite | 310/330 X |
| 3,029,743 | 4/1962 | Johns | 251/129 X |
| 3,093,710 | 6/1963 | Ten Eyck | 310/330 X |
| 4,194,194 | 3/1980 | Redfern | 310/332 X |
| 4,340,083 | 7/1982 | Cummins | 251/129 X |

OTHER PUBLICATIONS

Pribory I. Tekhnika Eksperimenta, No. 4, pp. 165–168, Jul.–Aug., 1980, (Garnov).

Primary Examiner—Arnold Rosenthal
Attorney, Agent, or Firm—Prutzman, Kalb, Chilton & Alix

[57] ABSTRACT

A piezoelectric valve with a cantilevered control arm assembly, comprising a piezoelectric valve operating arm and a contiguous limit arm for limiting the opening deflection of the valve operating arm.

13 Claims, 3 Drawing Figures 4,492,360

PIEZOELECTRIC VALVE

DESCRIPTION

1. Technical Field

The present invention relates generally to valves of the type employing the piezoelectric effect for operating the valves and more particularly to a new and improved piezoelectric valve having notatable utility as a high frequency on-off valve for delivering small pulses of fluid at a high frequency.

2. Disclosure of the Invention

It is a principal object of the present invention to provide a new and improved piezoelectric valve which is capable of high frequency on-off operation of up to 1,000 cycles per second or more.

It is another aim of the present invention to provide a new and improved fast acting piezoelectric valve capable of delivering small pulses of fluid at a high frequency. The new and improved piezoelectric valve has notable utility in supplying air or other gas pulses at a high frequency for delivering small pulses of dye for programmably and selectively coloring the threads of a woven fabric during the weaving process.

It is a further aim of the present invention to provide a new and improved piezoelectric valve of the type having a cantilever mounted valve control arm with an outer free end adapted to be piezoelectrically deflected for operating the valve. In accordance with the present invention, the cantilever mounted valve control arm employs a piezoelectric valve operator and a valve operator limit arm which together provide high frequency piezoelectric valve operation without undesirable valve member flutter or natural or harmonic vibration.

It is a further aim of the present invention to provide a new and improved piezoelectric valve of the type described which is compact and which provides reliable operation over a long service free life.

It is another aim of the present invention to provide a small piezoelectric valve having an economical design which permits the parts of the valve to be manufactured within a relatively wide tolerance range without affecting the operational characteristics of the valve.

It is another aim of the present invention to provide a new and improved piezoelectric gas valve operable for providing gas pulses at a high frequency.

Other objects will be in part obvious and in part pointed out more in detail hereinafter.

A better understanding of the invention will be obtained from the following detailed description and the accompanying drawings of an illustrative application of the invention.

BEST MODE FOR CARRYING OUT THE INVENTION

Figure 1:
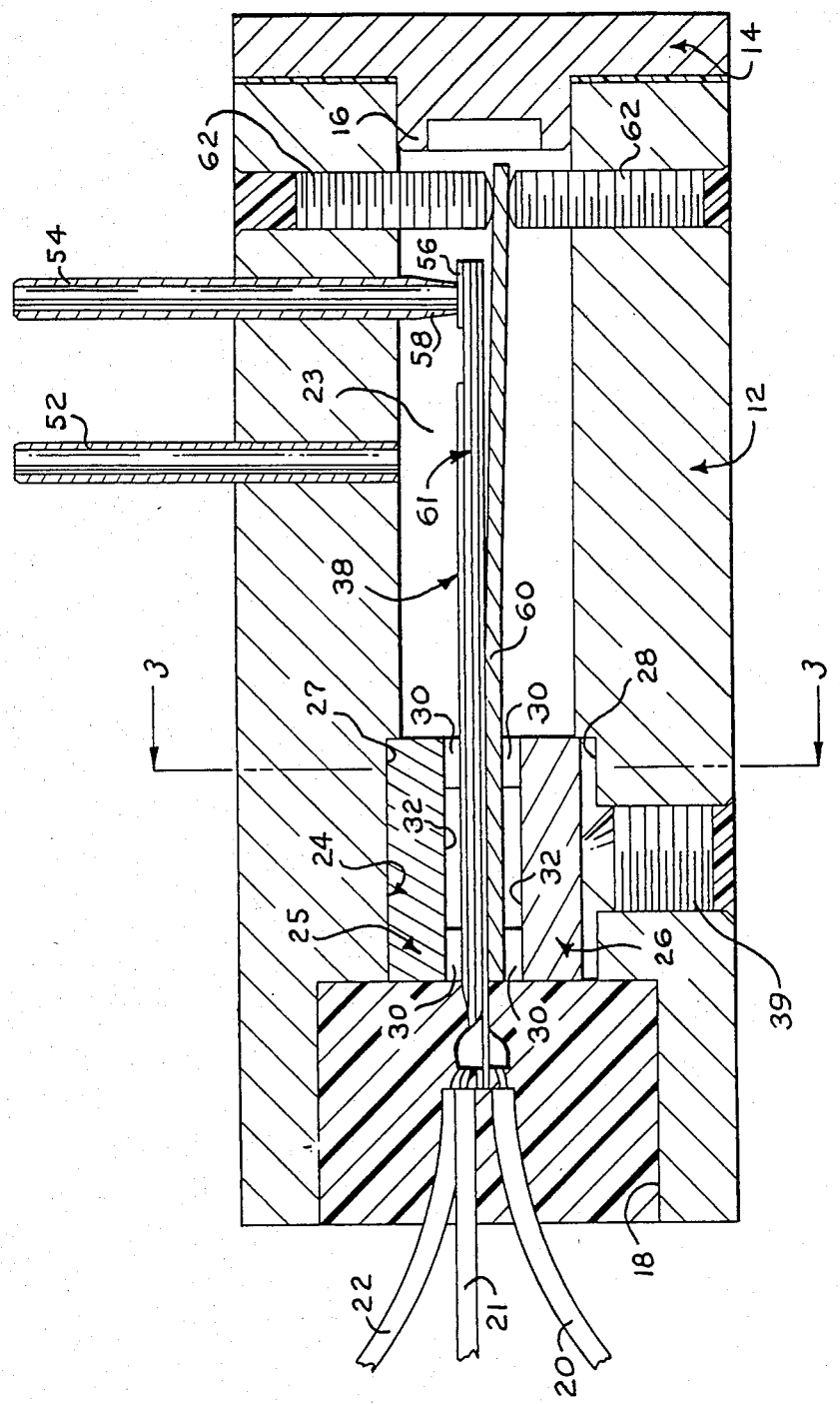
FIG. 1 is an axial section view, partly broken away and partly in section, of a piezoelectric valve incorporating an embodiment of the present invention.
Figure 2:
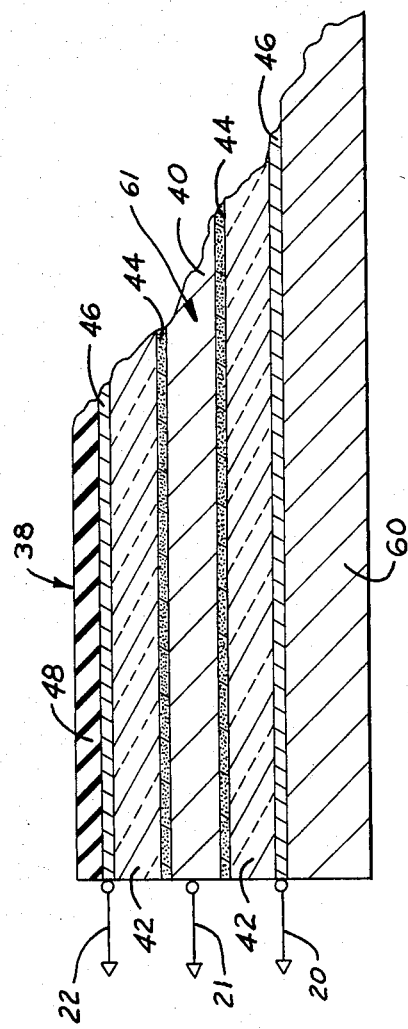
FIG. 2 is an enlarged partial axial section view, partly broken away and partly in section, of a control arm assembly of the valve, additionally diagrammatically showing the electrical conductors connected to the control arm electrodes.
Figure 3:
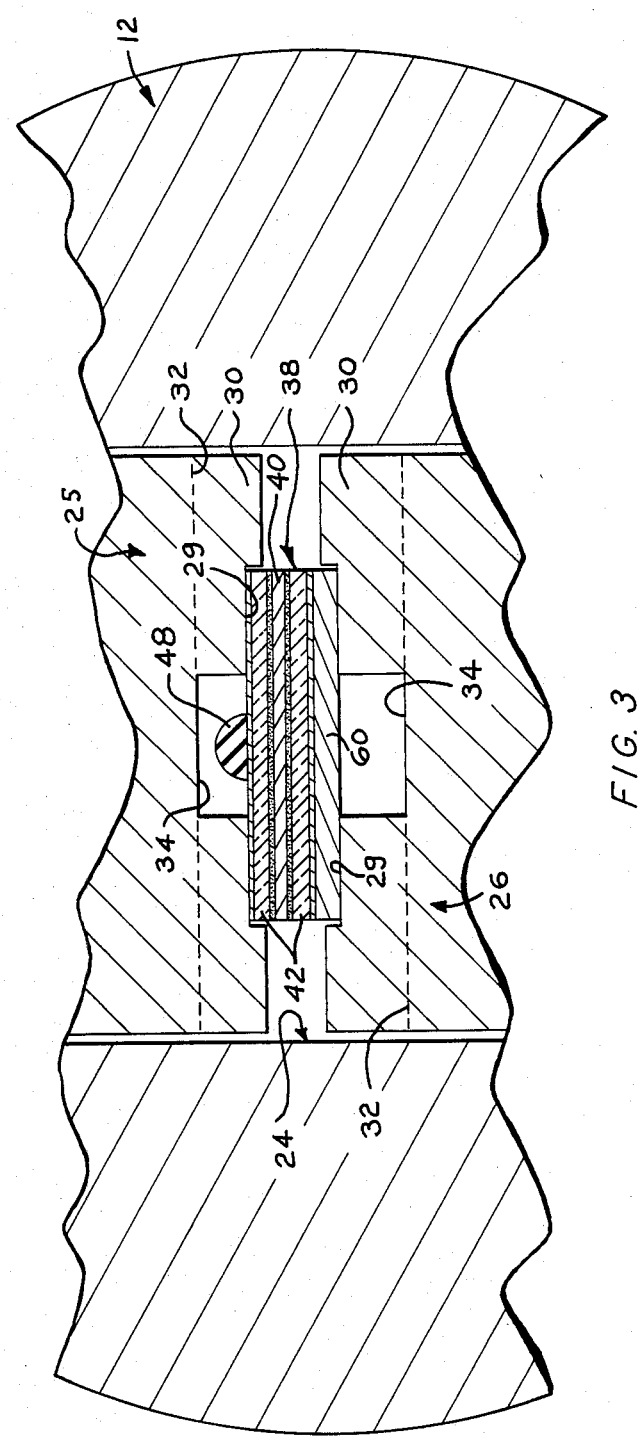
FIG. 3 is an enlarged transverse section view, partly broken away and partly in section, of the valve taken substantially along the line 3—3 of FIG. 1.

Referring now to the drawings in detail wherein the same numerals are used to represent the same or like parts throughout, a piezoelectric valve incorporating an embodiment of the present invention is shown comprising a cylindrical valve body 12 having a stepped axial bore and an outer end cap 14 with an inwardly projecting boss 16 received within the outer end of the bore. The end cap 14 is secured to the outer end of the valve body 12 with a suitable adhesive which seals the outer end of the valve body bore. The stepped bore has an enlarged cylindrical bore section 18 at its rear or inner end for receiving three electrical conductors 20-22 which connect the valve for electrical operation. The rear bore section 18 is potted with a suitable epoxy adhesive to secure the electrical conductors in place and to seal the rear end of the valve body bore.

A cylindrical bore section of the valve body bore just inwardly or rearwardly of the end cap 14 provides a valve operating chamber 23. A remaining axial bore section 24 in the valve body 12 has a rectangular transverse shape with upper and lower diametrically opposed parallel walls 27, 28. A pair of mounting blocks 25, 26 are supported within the rectangular bore section 24 with an outer flat face of the upper block 25 in engagement with the upper wall 27.

The rear end of an axially extending control arm assembly 38 is clamped between the two blocks 25, 26. For that purpose the lower block 26 is adjustable upwardly by a suitable set screw 39 to rigidly clamp the rear end of the control arm assembly 38 between the blocks 25 and 26. The control arm assembly 38 has a layered or sandwich structure comprising a plurality of elongated, axially extending layers described in detail hereinafter.

The two mounting blocks 25, 26 are preferably identical for economy of manufacture. The inner opposed clamping faces of the support blocks 25, 26 have shallow axially extending slots 29 for receiving and axially aligning the elongated control arm assembly 38. Also, each block 25, 26 is formed with two axially spaced pairs of laterally spaced clamping shoes 30 and an intermediate transverse slot 32 between the pairs of shoes 30 for firmly engaging predetermined axially and laterally spaced segments of the control arm assembly 38. Accordingly, the two mounting blocks 25, 26 provide for rigidly supporting the control arm assembly in a substantially uniform manner irrespective of any surface irregularities or variations in the thickness of the sandwich structure. Also, the lower floating block 26 automatically adjusts to firmly clamp the control arm assembly at the opposite axial ends of the mounting block. After the mounting blocks 25, 26 are mounted to securely clamp the control arm assembly 38 in position, the outer end of the threaded radial bore for the clamping screw 39 is filled with a suitable epoxy adhesive to lock the set screw 39 in place and seal the set screw bore.

The sandwich structure of the elongated control arm assembly 38 comprises an upper elongated valve operating arm 61 and an elongated flat plate 60 providing a limit arm or leaf spring for limiting the downward or opening displacement of the operating arm 61. The control arm assembly 38 is cantilever mounted at its inner or rear end between the blocks 25, 26 as described. The other end of the limit arm plate 60 is received within a pair of diametrically opposed radially extending set screws 62 mounted in the valve body 12. The set screws 62 are provided for adjustably deflecting the outer end of the limit arm plate 60 slightly downwardly from the outer free end of the operating arm 61 with the operating arm 61 in its closed position shown in FIG. 1. Since the limit arm plate 60 is rigidly secured between the mounting blocks 25, 26, it is deflected by the adjustment screws 62 to provide an upper slightly curved convex face engageable by the operating arm 61. The amount of curvature is adjustable with the set screws 62.

The limit arm plate 60 has two primary functions. It limits the downward or opening displacement of the operating arm 61 to that found to be optimum for each valve application and the desired valve operating frequency. Also, the limit arm plate 60, due to its curved upper surface, controls the opening movement of the operating arm 61 as it progressively engages the curved upper surface of the limit arm plate 60. Accordingly, the effective length of the operating arm 61 decreases as it opens, and as a result, the natural frequency of the operating arm 61 continually changes (increases) as it is withdrawn downwardly from its fully closed position shown in FIG. 1 to its fully open position lying on the curved limit plate 60. The limit plate 60 thereby dampens the operating arm motion to prevent operating arm bounce or flutter or vibration at its natural or harmonic frequency.

Inlet and outlet tubular connectors 52, 54 respectively are mounted within axially spaced radially extending bores within the valve body 12 and secured therein by an epoxy or other suitable adhesive. The shown connectors 52, 54 provide for connecting the valve to suitable flexible conduits (not shown) made for example of teflon or other plastic. The inlet connector 52 is mounted preferably with its inner end generally flush with the valve operating chamber 23. The outlet connector 54 is mounted with its inner end 58 extending into the operating chamber. Also, the inner end 58 of the outlet connector 54 is tapered to provide a valve seat at the inner axial end face of the connector. The operating arm has a valve pad 56 of silicone rubber at its free end which is engageable with the valve seat for closing the valve. The valve is designed primarily for use with a gas fluid and with a pressure differential of up to 10 psi or more. Also, it can be seen that the fluid pressure differential assists in holding the valve pad 56 in engagement with the seat when the valve operating arm 61 is closed.

The valve operating arm 61 has a layered or sandwich construction with a center brass electrode plate 40, a piezoelectric crystal layer or plate 42 secured to each face of the center electodrode plate 40 by a suitable electrically conductive adhesive layer 44, a thin silver electrode plate or layer 46 suitably deposited on the outer surface of each piezoelectric crystal layer 42 and an electrically conductive elastic rubber bead 48 on the outer surface of the upper silver layer 46. The center brass plate 40 and the outer silver layers 46 provide electrodes for applying a suitable voltage differential to the intermediate piezoelectric layers 42 and are separately connected to the three electrical conductors 20–22 at the rear end of the valve operating arm 61. The central brass plate 40, crystal layers 42 and silver layers 46 extend the full length of the valve operating arm 61. The upper conductive elastic bead 48 extends substantially the full length of the valve operating arm 61 to the valve pad 56. A narrow but relatively deep axially extending slot 34 is provided in the upper mounting block 25 (and also in the lower mounting block 26 because the blocks 25, 26 are preferably identical) for the upper elastic bead 48. The bead 48 provides an elastic conductive bridge along substantially the full length of the upper silver electrode layer 46 to bridge any cracks causing conductive breaks in that layer. The lower limit arm plate 60 is made of brass and similarly serves as a conductive bridge across any cracks or conductive breaks in the lower silver electrode layer 46.

The central electrode plate 40 is connected to a ground or base voltage and the silver electrode layers 46 are alternately connected to an operating voltage to open and close the valve. When a suitable voltage differential (e.g. 160 volts) is applied to the lower piezoelectric layer 42, the lower piezoelectric crystal layer 42 physically contracts to bend the valve operating arm 61 downwardly and open the valve. After the valve is opened, the same voltage differential is applied to the upper piezoelectric crystal layer 42 to bend the valve operating arm 61 upwardly to close the valve. As the physical contraction of the piezoelectric layer 42 is practically instantaneous upon the application of a suitable voltage differential, the valve is exceedingly fast-acting and a valve on/off operating frequency of up to 1,000 cycles per second has been achieved. Also, the cantilever mounted arm arrangement provides for magnifying the opening and closing movement of the valve pad to enhance the high speed operation of the valve.

As will be apparent to persons skilled in the art, various modifications, adaptations and variations of the foregoing specific disclosure can be made without departing from the teachings of the present invention.

We claim:

1. In a piezoelectric valve having an elongated, cantilevered control arm assembly with an elongated, cantilevered, piezoelectric valve operating arm adapted to be selectively piezoelectrically deflected in at least one direction in a plane of operation thereof for selectively operating the valve, and mounting means cantilever mounting the control arm assembly, the improvement wherein the control arm assembly further comprises an elongated, cantilevered, limit arm having inner and outer ends and being mounted contiguous to the valve operating arm in its said plane of operation with said outer end separate from said operating arm and adapted to engage said operating arm to limit the deflection of the valve operating arm in its said one direction.

2. A piezoelectric valve according to claim 1 wherein the mounting means cantilever mounts the valve operating arm and the limit arm in generally contiguous association in said plane of operation of the valve operating arm.

3. A piezoelectric valve according to claim 1 wherein the valve operating arm comprises a main elongated electrode plate, a longitudinally extending piezoelectric crystal layer on each side of the main electrode plate, an outer longitudinally extending electrode layer on each piezoelectric crystal layer, and an elastic conductive layer on at least one of the outer electrode layers to maintain electrical conductance along said one outer electrode layer.

4. A piezoelectric valve according to claim 3 wherein the mounting means cantilever mounts the valve operating arm and the limit arm in generally parallel contiguous association in said plane of operation of the valve operating arm with the limit arm in contiguous association with the other outer electrode layer.

5. A piezoelectric valve according to claim 1 wherein the outer end of said limit arm has a curved upper surface for progressively engaging said operating arm when it is deflected in said one direction.

6. A piezoelectric valve according to claim 5 which comprises adjustment means for adjustably varying the curvature of said curved upper surface of said limit arm.

7. In a piezoelectric valve having an elongated, cantilevered control arm assembly with an elongated, cantilevered, piezoelectric valve operating arm adapted to be selectively piezoelectrically deflected in at least one direction in a plane of operation thereof for selectively operating the valve, and mounting means cantilever mounting the control arm assembly, the improvement wherein the control arm assembly further comprises an elongated, cantilevered, leaf spring having a free end and being mounted contiguous to the valve operating arm in its said plane of operation for limiting the deflection of the valve operating arm in its said one direction and deflection adjustment means for adjustably deflecting the free end of the leaf spring in said plane of operation of the valve operating arm to adjustably limit the deflection of the valve operating arm in its said one direction.

8. A piezoelectric valve according to claim 7 wherein the leaf spring and valve operating arm have opposed generally flat faces in contiguous association.

9. A piezoelectric valve according to claim 7 wherein the deflection adjustment means is adjustable to bend the leaf spring in said plane to provide a convex limit surface for increasing engagement by the valve operating arm as it is deflected in its said one direction.

10. A piezoelectric valve according to any of claims 1, 2, 8, 9, or 7, wherein the mounting means comprises a pair of opposed supports on opposite sides of the control arm assembly for clamping the control arm assembly therebetween.

11. A piezoelectric valve according to claim 10 wherein the valve operating arm and limit arm are mounted in an assembly thereof in parallel contiguous association generally in said plane of operation of the valve operating arm, and wherein the pair of supports are mounted on opposite sides of said control arm assembly generally in said plane of operation of the valve operating arm for clamping said assembly therebetween.

12. A piezoelectric valve according to claim 11 wherein the pair of opposed supports have longitudinally spaced pairs of opposed clamping shoes for clamping the control arm assembly therebetween.

13. In a piezoelectric valve having an elongated, cantilevered control arm assembly with an elongated cantilevered, piezoelectric valve operating arm adapted to be selectively piezoelectrically deflected in at least one direction in a plane of operation thereof for selectively operating the valve and mounting means cantilever mounting the control arm assembly, the improvement wherein the mounting means comprises a pair of opposed supports having longitudinally spaced pairs of opposed laterally spaced clamping shoes clamping the control arm assembly therebetween.

* * * * *